United States Patent [19]

Morimoto et al.

[11] Patent Number: 4,708,031

[45] Date of Patent: Nov. 24, 1987

[54] TRANSMISSION RATIO CONTROL SYSTEM FOR A CONTINUOUSLY VARIABLE TRANSMISSION

[75] Inventors: Yoshihiko Morimoto, Mitaka; Kazunari Tezuka, Asaka, both of Japan

[73] Assignee: Fuji Jukogyo Kabushiki Kaisha, Tokyo, Japan

[21] Appl. No.: 63

[22] Filed: Jan. 2, 1987

[30] Foreign Application Priority Data

Jan. 9, 1986 [JP] Japan ................................ 61-2689

[51] Int. Cl.$^4$ .................... B60K 41/12; B60K 41/18; B60K 41/16
[52] U.S. Cl. ...................................... 74/866; 74/867; 364/424.1
[58] Field of Search ................ 74/866, 867; 364/424.1

[56] References Cited

U.S. PATENT DOCUMENTS

| 3,918,312 | 11/1975 | Espenschied et al. | 74/866 X |
| 4,397,379 | 8/1983 | Baudoin | 74/866 X |
| 4,545,265 | 10/1985 | Abo et al. | 74/867 X |
| 4,547,178 | 10/1985 | Hayakawa et al. | 74/867 X |
| 4,612,828 | 9/1986 | Ide et al. | 74/867 X |

FOREIGN PATENT DOCUMENTS

| 0182616 | 5/1986 | European Pat. Off. | |
| 2152162 | 7/1985 | United Kingdom | 74/866 |

Primary Examiner—Leslie Braun
Assistant Examiner—D. Wright
Attorney, Agent, or Firm—Martin A. Farber

[57] ABSTRACT

A control system for a continuously variable transmission for a motor vehicle has a line pressure control valve having a spool for controlling oil supplied to a cylinder of a driven pulley to change the transmission ratio. The control system operates to increase the line pressure when the vehicle stops. The increased line pressure actuate the cylinder thereby increasing the transmission ratio.

7 Claims, 4 Drawing Figures

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the transmission ratio at a stop of the vehicle.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependence on driving conditions. The system is provided with a line pressure control valve and a transmission ratio control valve. Each valve comprises a spool to control the oil supplied to the servo devices.

The transmission ratio control valve operates to decide the transmission ratio in accordance with the opening degree of a throttle valve of an engine and the speed of the engine. The line pressure control valve is adapted to control the line pressure in accordance with the transmission ratio and the engine speed. Output of an engine is transmitted to the drive pulley through a clutch. The line pressure is controlled to prevent the belt from slipping on pulleys in order to transmit the output of the engine.

In a control system described in EP-A 0182616, a drive pulley speed (engine speed) sensor, a driven pulley speed sensor, and a throttle position sensor are provided. Actual transmission ratio (i) is calculated by a calculator based on the output signal ($N_P$) of the drive pulley speed sensor and the output signal ($N_S$) of the driven pulley speed sensor with a formula ($i = N_P/N_S$). Desired transmission ratio (id) is calculated based on the output signal ($N_S$) of the driven pulley speed sensor and the output signal ($\theta$) of the throttle position sensor. The actual transmission ratio i is controlled to the desired transmission ratio id by shifting the spool of the transmission ratio control valve.

In such a system, when the vehicle stops, the drive and driven pulleys stop, and hence the transmission ratio at that time can not be calculated based on the speeds of both pulleys. In an ordinary decelerating operation, the transmission ratio gradually increases, and the ratio reaches a maximum ratio when the vehicle stops.

However, when the vehicle is rapidly decelerated, the vehicle is stopped before the transmission ratio reaches the maximum ratio, and the belt stays in a lower ratio position than the maximum transmission ratio position. In such a state, when an accelerator pedal is depressed in order to re-start the vehicle, the belt may slip on the pulleys because of the lower transmission ratio. The slipping causes wear and tear of the belt.

SUMMARY OF THE INVENTION

The object of the present invention is to provide a system which may prevent a belt from slipping at the re-start of a vehicle by downshifting the transmission to a maximum ratio.

To this end, in accordance with the present invention, line pressure of the transmission is increased to a large value, thereby downshifting the transmission at a stop of the vehicle.

According to the present invention, there is provided a control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including a hydraulically shiftable disc and a second hydraulic cylinder for operating the disc, a belt engaged with both pulleys, a transmission ratio control valve having ports and a spool, a line pressure control valve having ports and a spool, a first hydraulic circuit having a pump for supplying oil to the first and second cylinders through the line pressure control valve and the transmission ratio control valve. In accordance with the present invention, the system comprises detecting means for detecting load on the engine and for producing a load signal, first means responsive to the load signal for producing a desired line pressure signal, second means responsive to the desired line pressure signal for shifting the spool of the line pressure control valve so as to provide a line pressure, detecting means for detecting a stop of the vehicle and producing a stop signal, and third means responsive to the stop signal for increasing the line pressure so as to operate the second hydraulic cylinder to increase the transmission ratio.

The other objects and features of this invention will become understood from the following description with reference to the accompanying drawings.

DETAILED DESCRIPTION OF THE PREFERRED EMBODIMENT

Figure 1:
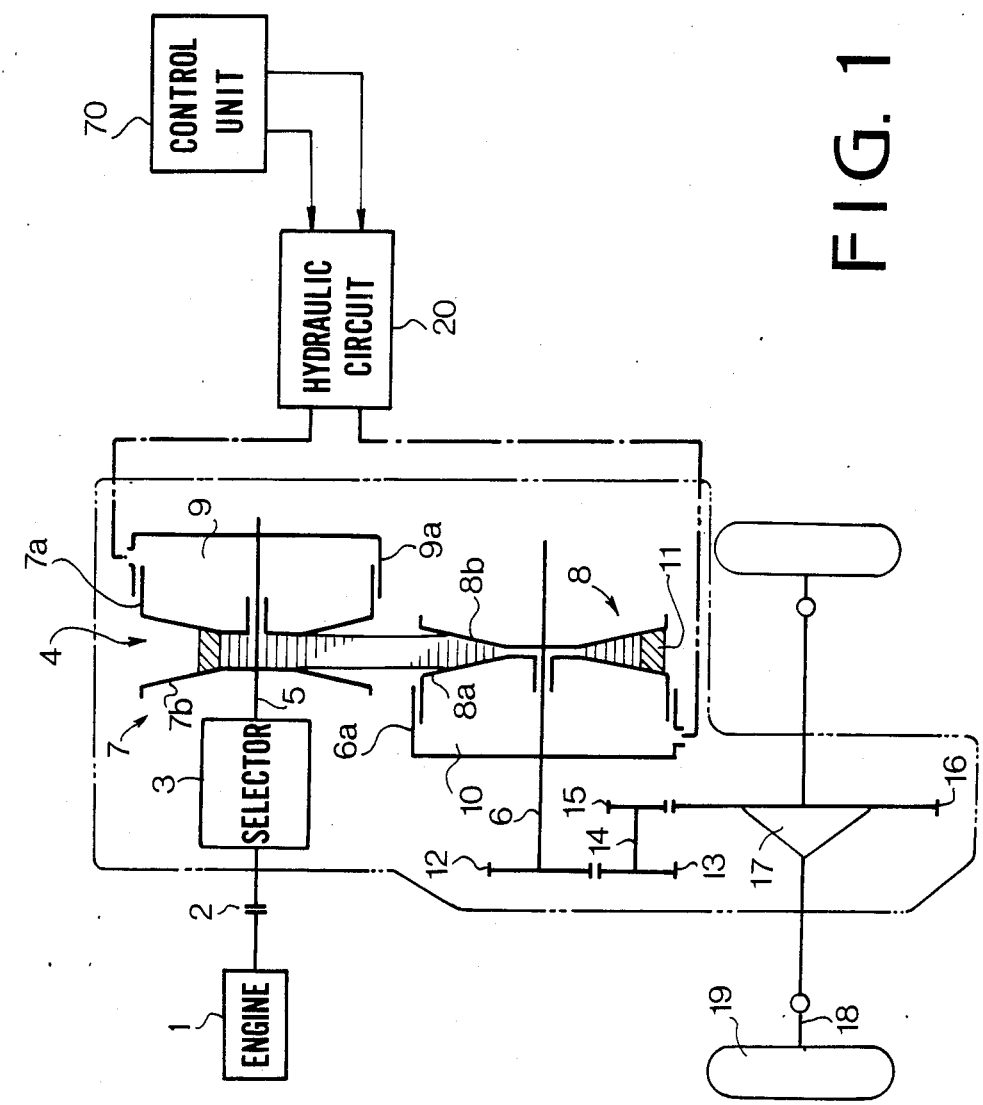
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
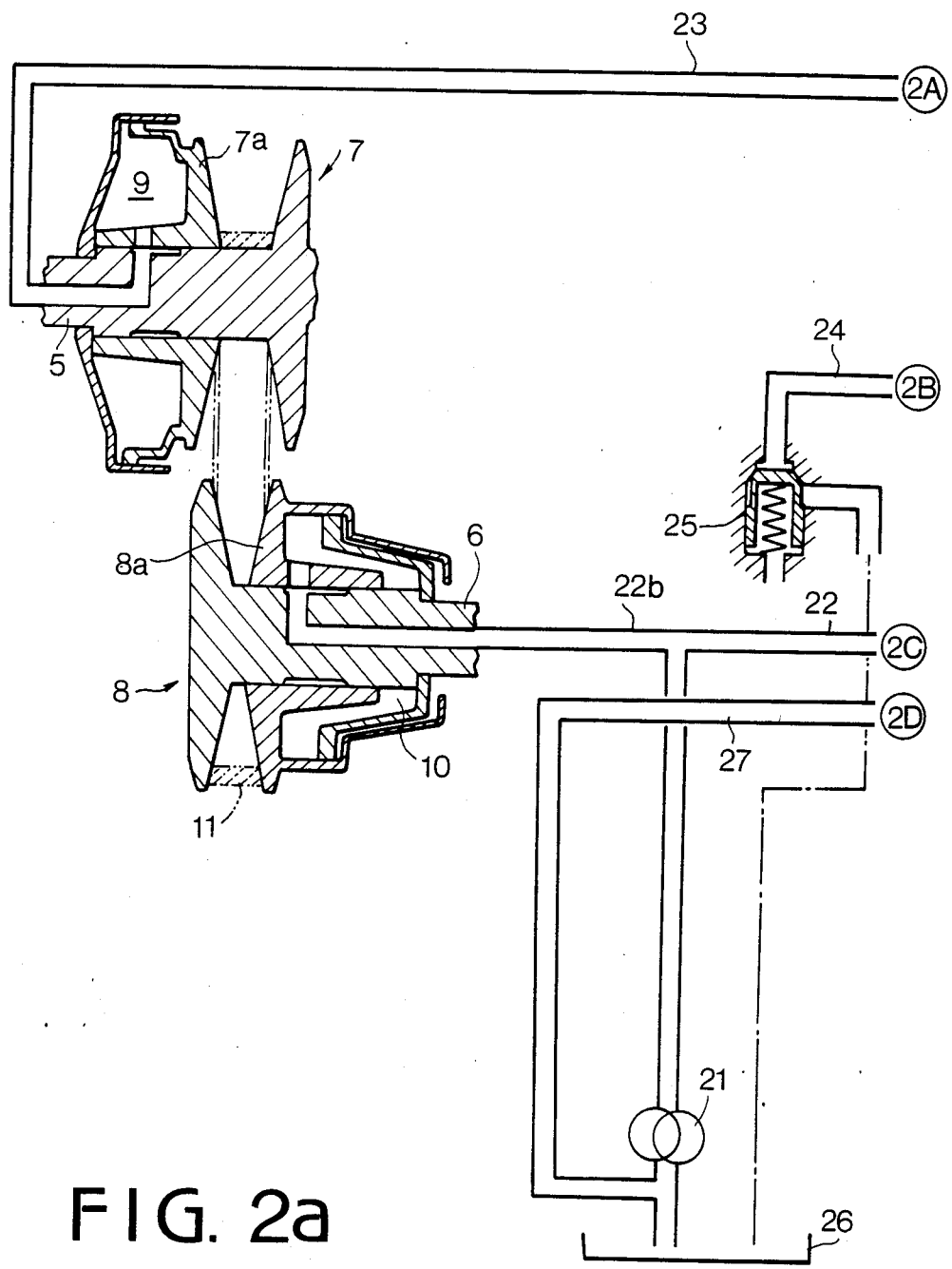
FIGS. 2a and 2b are schematic diagrams showing a control system according to the present invention.
Figure 2B:
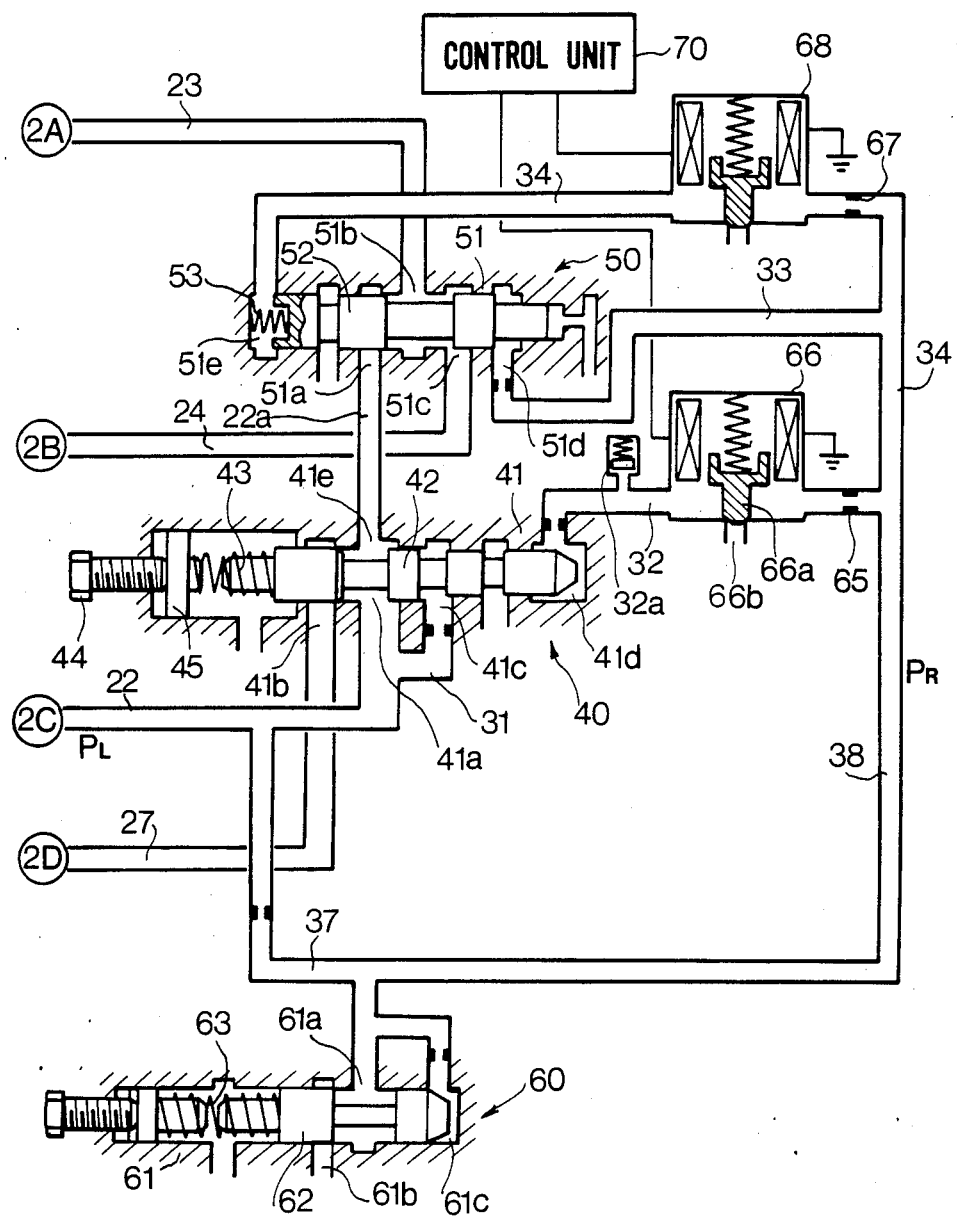

Referring to FIGS. 2a and 2b, chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and conduit 23. The chamber 10 of driven pulley 8 is applied with pressurized oil through a passage 22b without passing through valves 40 and 50. The movable conical disc 7a of the drive pulley 7 is so designed that the pressure receiving area thereof is larger than that of movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, spring 53 for urging the spool 52 in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with port 41e of line pressure control valve 40 through conduit 22a. The drain port 51c is communicated with the oil reservoir 26 through a conduit 24 and a check valve 25.

The system is provided with a regulator valve 60, and solenoid operated on-off valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through an orifice 67, solenoid operated on-off valve 68 and a passage 34. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The on-off valves 66 and 68 are operated by signals from a control unit 70. Thus, pressure controlled by the on-off valves 66 and 68 is applied to chambers 41d and 51e.

In the transmission ratio control valve 50, the pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of pulses for operating the on-off valve 68. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51e. Further, the speed of the movement of the spool 52 changes with the magnitude of changing of the duty ratio. The spool 52 is shifted to an oil drain position by decreasing the duty ratio. It will be understood that when the oil is supplied to the chamber 9, the transmission is upshifted.

Figure 3:
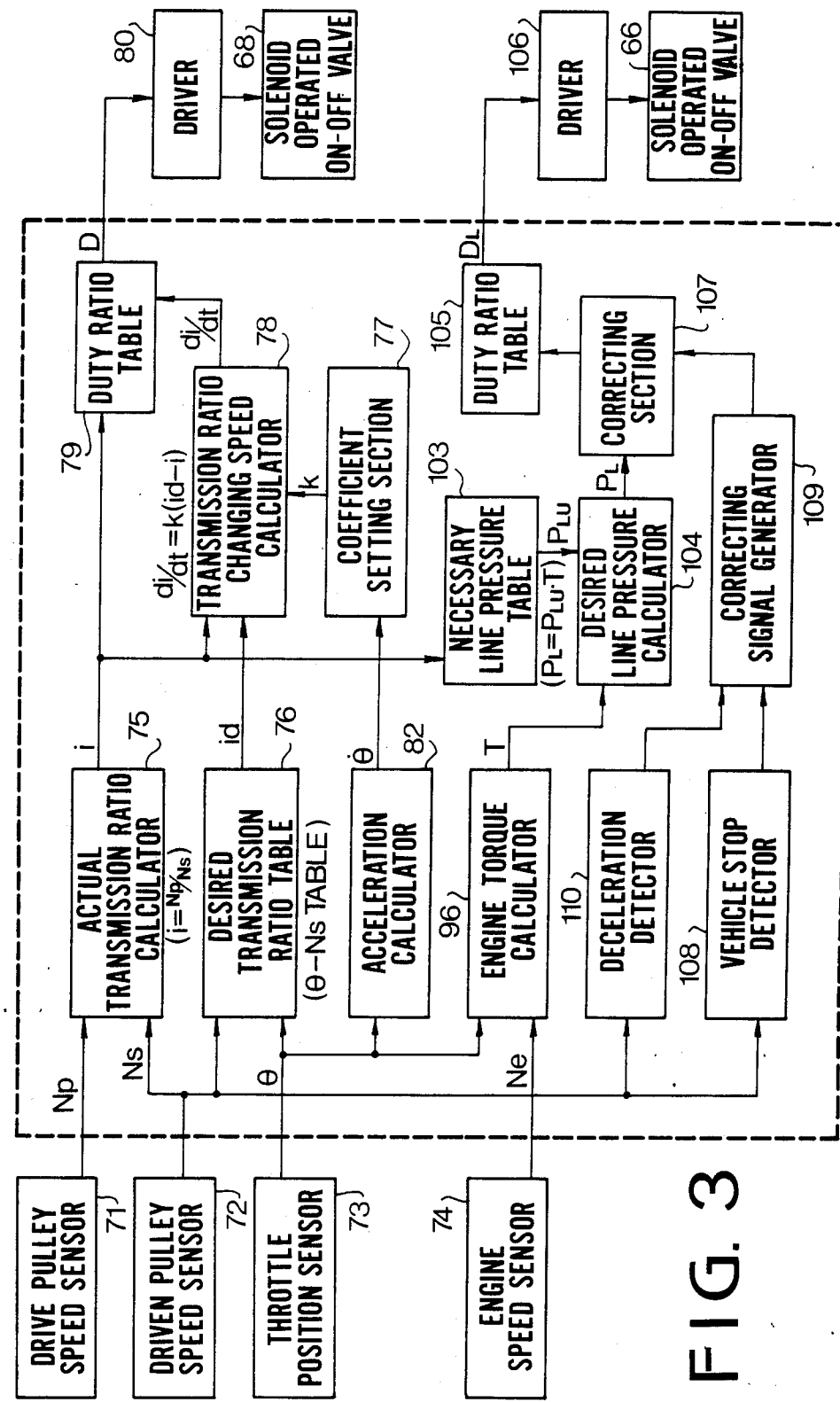
FIG. 3 is a block diagram showing a control unit.

Referring to FIG. 3, a drive pulley speed sensor 71, driven pulley speed sensor 72, engine speed sensor 73 and throttle position sensor (or intake manifold pressure sensor) 74 are provided. Output signals $N_p$ and $N_s$ of sensors 71, 72 are fed to an actual transmission ratio calculator 75 to produce an actual transmission ratio i in accordance with $i = N_p/N_s$. Output signal N and output signal $\theta$ of the throttle position sensor 74 are fed to a desired transmission ratio table 76. The desired transmission ratio id is calculated by the calculator 76 in accordance with the signals $N_s$ and $\theta$. The desired transmission ratio id is fed to a transmission ratio changing speed calculator 78. On the other hand, the output $\theta$ is fed to an acceleration calculator 82 to obtain acceleration $\dot{\theta}$. The signal of the acceleration $\dot{\theta}$ is supplied to a coefficient setting section 77 to produce a coefficient K. The actual transmission ratio i, corrected desired transmission ratio id and coefficient K from the coefficient setting section 77 are applied to a transmission ratio changing speed calculator 78 to produce a transmission ratio changing speed di/dt from the formula $di/dt = -K(id - i)$.

The speed di/dt and actual ratio i are applied to a duty ratio table 79 to derive the duty ratio D. The duty ratio D is supplied to the solenoid operated on-off valve 68 through a driver 80.

Further, the output signal $\theta$ of throttle position sensor 74 and the output $N_e$ of engine speed sensor 73 are fed to an engine torque calculator 96, so that engine torque T is calculated based on throttle position $\theta$ and engine speed Ne.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_L$ is calculated.

The desired line pressure $P_L$ is applied to a duty ratio table 105 through a correcting section 107 to derive a duty ratio $D_L$ corresponding to a corrected desired line pressure $P_L$. The duty ratio $D_L$ is supplied to a driver 106 which operates the solenoid operated on-off valve 66 at the duty ratio.

In the system of the present invention, a vehicle stop detector 108 is provided to receive the output signal $N_S$ of the driven pulley speed sensor 72. The detector 108 produces a vehicle stop signal when the output signal $N_S$ is zero. The vehicle stop signal is applied to a correcting signal generator 109 which produces a line pressure increasing signal for a predetermined time. The line pressure increasing signal is applied to the correcting section 107 where the desired line pressure is increased to a large value for the predetermined time. A deceleration detector 110 is provided for producing a deceleration signal representing the magnitude of deceleration before the stop of the vehicle. The correcting period of the time can be changed at the correcting signal generator 109 by the deceleration signal.

In operation, while the vehicle is at a stop, chamber 10 of the driven pulley 8 is supplied with line pressure through passage 22b, and the chamber 9 of the drive pulley 7 is drained, since the $N_P$, $N_s$, $\theta$ are zero and duty ratio D is zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to axles of the driving wheels 19. Thus, the vehicle is started. When the vehicle speed (output signal $N_s$) exceeds a predetermined value, the clutch 2 is entirely engaged.

At the start of the vehicle, the line pressure is at the highest value by the line pressure control valve 40, since the duty ratio for the valve 66 is large, and the spool 42 of the control valve 40 is at the right end position. When the throttle valve is opened for acceleration, the desired transmission ratio id and transmission ratio changing speed di/dt are obtained by table 76 and calculator 78, and duty ratio D is obtained from the table 79. The value of the duty ratio D is larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23. On the other hand, duty ratio for the control valve 66 is reduced, thereby shifting the spool 42 of the valve 40 to the left. The port 41a communicates with the port 41b of the drain passage 27. Thus, line pressure reduces, and the transmission is upshifted, since oil is still supplied to the chamber 9 through the control valve 50.

As the difference between the desired ratio id and actual ratio i becomes large, the transmission changing speed di/dt becomes large, thereby increasing the duty ratio for the on-off valve 68. When the opening degree of the throttle valve is reduced for deceleration, the duty ratio is reduced, thereby shifting the spool 52 to the right to drain the chamber 9. Thus, the transmission is downshifted. The transmission changing speed at downshifting increases with reducing of the duty ratio.

The control operation of line pressure will be described hereinafter. From the engine torque calculator 96, a torque T is obtained in accordance with throttle position $\theta$ and engine speed $N_e$, which is applied to desired line pressure calculator 104. The calculator calculates a desired line pressure $P_L$ which is fed to the duty ratio table 105 through correcting section 107. The solenoid operated on-off valve 66 is operated at the duty ratio desired by the table 105. The line pressure is applied to chamber 10 to hold the belt 11 at a necessary minimum force, the transmitting torque at which is slightly larger than torque T. Thus, power is transmitted through the transmission without slipping of the belt.

When the vehicle stops and the output signal $N_S$ of the driven pulley speed sensor 72 becomes zero, the correcting signal generator 109 produces a line pressure increasing signal for a predetermined time. The line pressure increasing signal is applied to the correcting section 107, so that the desired line pressure is increased to a large value for the predetermined time. As described above, during the deceleration of the vehicle, the transmission is downshifted by supplying the oil in the chamber 10. When the line pressure is increased, the flow rate of oil supplied to the chamber 10 is increased. Accordingly, the transmission is quickly downshifted to the maximum transmission ratio, even if the transmission ratio does not reach the maximum ratio at the stop of the vehicle. Thus, the vehicle can be smoothly restarted without slipping of the belt.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including a hydraulically shiftable disc and a second hydraulic cylinder for operating the disc of the driven pulley, a belt engaged with both pulleys, a transmission ratio control valve having ports and a spool, a line pressure control valve having ports and a spool, a first hydraulic circuit having a pump for supplying oil to the first and second cylinders through the line pressure control valve which controls line pressure and the transmission ratio control valve, the system comprising:

detecting means for detecting load on the engine and for producing a load signal;
   first means responsive to the load signal for producing a desired line pressure signal;
   second means responsive to the desired line pressure signal for shifting the spool of the line pressure control valve so as to provide control the line pressure;
   detecting means for detecting a stop of the vehicle and producing a stop signal;
   third means responsive to the stop signal for increasing the line pressure so as to operate the second hydraulic cylinder to increase the transmission ratio.

2. The control system according to claim 1 wherein the second means includes a second hydraulic circuit for supplying the oil to the line pressure control valve so as to shift the spool of the line pressure control valve, said second means includes control valve means provided in the second hydraulic circuit for controlling the amount of the oil supplied to the line pressure control valve so as to shift the spool of the line pressure control valve, said first means responsive to the load signal for producing an output signal for driving the control valve means.

3. The control system according to claim 2 wherein the control valve means is a solenoid operated on-off valve, and the output signal of the control means is pulses, the duty ratio of which is changed so as to control the line pressure.

4. The control system according to claim 3 wherein the second hydraulic circuit is provided with a regulator valve for maintaining the pressure of the oil in the second hydraulic circuit at a constant value.

5. The control system according to claim 1 further comprising fourth means detecting the magnitude of deceleration before the stop of the vehicle and for producing a deceleration signal, and fifth means responsive to the deceleration signal for changing the duration of the line pressure increasing period of time.

6. The control system according to claim 2 wherein said third means is responsive to the stop signal for producing an output for driving the control valve means.

7. A control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including a hydraulically shiftable disc and a second hydraulic cylinder for operating the disc of the driven pulley, a belt engaged with both pulleys, a transmission ratio control valve having ports and a spool, a line pressure control valve having parts and a spool first hydraulic circuit having a pump for supplying oil to the first and second cylinders through the line pressure control valve which controls line pressure and the transmission ratio control valve, the system comprising:

detecting means for detecting a stop of the vehicle and producing a stop signal, first means responsive to the stop signal for producing a line pressure correction signal, second means responsive to the line pressure correction signal for shifting the spool of the line pressure control valve so as to increase the line pressure so as to operate the second hydraulic cylinder to increase the transmission ratio.

* * * * *